(12) United States Patent
Nagasaka

(10) Patent No.: US 11,159,699 B2
(45) Date of Patent: Oct. 26, 2021

(54) IMAGE PROCESSING APPARATUS WITH DETECTED COLOR CHANGE ORIENTATION, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Hitoshi Nagasaka, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/830,642

(22) Filed: Mar. 26, 2020

(65) Prior Publication Data

US 2020/0329173 A1 Oct. 15, 2020

(30) Foreign Application Priority Data

Apr. 15, 2019 (JP) .............................. JP2019-077355

(51) Int. Cl.
| | |
|---|---|
| *H04N 1/60* | (2006.01) |
| *H04N 1/053* | (2006.01) |
| *H04N 1/58* | (2006.01) |
| *H04N 1/407* | (2006.01) |

(52) U.S. Cl.
CPC ............ *H04N 1/6027* (2013.01); *H04N 1/053* (2013.01); *H04N 1/407* (2013.01); *H04N 1/58* (2013.01); *H04N 1/6072* (2013.01)

(58) Field of Classification Search
CPC ............... H04N 1/40–648; G06K 15/18–1898
See application file for complete search history.

(56) References Cited

U.S. PATENT DOCUMENTS

| 10,582,088 B2 | 3/2020 | Nagasaka | |
|---|---|---|---|
| 2017/0053196 A1* | 2/2017 | Nagasaka | ............. G06F 3/1285 |

FOREIGN PATENT DOCUMENTS

JP 2010-056931 A 3/2010

* cited by examiner

*Primary Examiner* — Scott A Rogers
(74) *Attorney, Agent, or Firm* — Venable LLP

(57) ABSTRACT

An information processing apparatus transmits data to a printer and includes at least one memory device that stores a set of instructions, and at least one processor that executes the set of instructions to receive a print setting and a gradation object, detect an orientation of a color change in the gradation object and, based on the print setting and the detected orientation, determine whether the orientation of the color change in the gradation object when rendered in the printer matches a main scanning direction of the printer. Based on a determination that the orientation matches the main scanning direction, the gradation object is rendered in the information processing apparatus and then the rendered gradation object is transmitted to the printer, and based on a determination that the orientation does not match the main scanning direction, the gradation object is transmitted to the printer without rendering the gradation object in the information processing apparatus.

10 Claims, 10 Drawing Sheets

F I G. 2A

```xml
<FixedPage Height="793.76" Width="1122.56" xml:lang="und" xmlns="..." >
  <Canvas RenderTransform="1,0,0,1,19.2,19.36">
    <Path>
      <Path.Fill>
        <LinearGradientBrush MappingMode="Absolute" StartPoint="0,0" EndPoint="0,300">
          <LinearGradientBrush.GradientStops>
            <GradientStop Color="#111111" Offset="0" />   <!--COLOR OF Start(UPPER PORTION) IS #111111(DARK BLACK) -->
            <GradientStop Color="#EEEEEE" Offset="1" />   <!--COLOR OF End(LOWER PORTION) IS #EEEEEE(LIGHT BLACK) -->
          </LinearGradientBrush.GradientStops>
        </LinearGradientBrush>
      </Path.Fill>
      <Path.Data>
        <PathGeometry>
          <PathFigure StartPoint="0,0">
            <PolyLineSegment Points="300,0 300,300 0,300" />
          </PathFigure>
        </PathGeometry>
      </Path.Data>
    </Path>
  </Canvas>
</FixedPage>
```

```
TRIVERTEX        vert[2];
GRADIENT_RECT    gradRect;

vert [0] .x      = 0;
vert [0] .y      = 0;
vert [0] .Red    = 0x1111;
vert [0] .Green  = 0x1111;
vert [0] .Blue   = 0x1111;
vert [0] .Alpha  = 0x1111;

vert [1] .x      = 100;
vert [1] .y      = 300;
vert [1] .Red    = 0xEEEE;
vert [1] .Green  = 0xEEEE;
vert [1] .Blue   = 0xEEEE;
vert [1] .Alpha  = 0xEEEE;

gRect.UpperLeft  = 0;
gRect.LowerRight = 1;

GradientFill(pDrawParam->hDC, vert, 2, &gRect, 1, GRADIENT_FILL_RECT_V);
```

F I G. 9A

```
<FixedPage Height="793.76" Width="1122.56" xml:lang="und" xmlns="...">
 <Canvas RenderTransform="1,0,0,1,19.2,19.36">
  <Path>
   <Path.Fill>
    <LinearGradientBrush MappingMode="Absolute" StartPoint="0,0" EndPoint="0,300">
     <LinearGradientBrush.GradientStops>
      <GradientStop Color="#111111" Offset="0" />   <!--COLOR OF Start(UPPER PORTION) IS #111111(DARK BLACK)-->
      <GradientStop Color="#EEEEEE" Offset="1" />   <!--COLOR OF End(LOWER PORTION) IS #EEEEEE(LIGHT BLACK)-->
     </LinearGradientBrush.GradientStops>
    </LinearGradientBrush>
   </Path.Fill>
   <Path.Data>
    <PathGeometry>
     <PathFigure StartPoint="0,0">
      <PolyLineSegment Points="300,0 300,300 0,300" />
     </PathFigure>
    </PathGeometry>
   </Path.Data>
  </Path>
 </Canvas>
</FixedPage>
```

FIG. 9B

```
<FixedPage Height="793.76" Width="1122.56" xml:lang="und" xmlns="...">
  <Canvas RenderTransform="1,0,0,1,19.2,19.36">
    <Path>
      <Path.Fill>
        <RadialGradientBrush MappingMode="Absolute" Center="150,150" GradientOrigin="150,150" RadiusX="200" RadiusY="200">
          <RadialGradientBrush.GradientStops>
            <GradientStop Color="#111111" Offset="0"/>   <!--COLOR OF Start(CENTER PORTION) IS #111111(DARK BLACK) -->
            <GradientStop Color="#EEEEEE" Offset="1"/>   <!--COLOR OF End(PERIPHERAL PORTION) IS #EEEEEE(LIGHT BLACK) -->
          </RadialGradientBrush.GradientStops>
        </RadialGradientBrush>
      </Path.Fill>
      <Path.Data>
        <PathGeometry>
          <PathFigure StartPoint="0,0" IsClosed="true">
            <PolyLineSegment Points="300,0 300,300 0,300"/>
          </PathFigure>
        </PathGeometry>
      </Path.Data>
    </Path>
  </Canvas>
</FixedPage>
```

IMAGE PROCESSING APPARATUS WITH DETECTED COLOR CHANGE ORIENTATION, IMAGE PROCESSING METHOD, AND NON-TRANSITORY COMPUTER-READABLE STORAGE MEDIUM

BACKGROUND OF THE INVENTION

Field of the Invention

The present invention relates to an image processing apparatus, an image processing method, and a non-transitory computer-readable storage medium.

Description of the Related Art

One of the input commands accepted by a printer driver is a print request including a drawing object referred to as a "gradation drawing". FIGS. 1A to 1C illustrate specific rendering examples. FIG. 1A illustrates a gradation drawing having a gradation called a linear gradation in which same colors are arranged in straight lines. Such a gradation drawing is included in an input command (such as in FIG. 2A). In many cases, a gradation drawing is expressed in a PDL (Page Description Language) for a diagram drawing or an image drawing by a printer driver, and is output as an output command (such as in FIG. 2B).

A diagram drawing is a drawing expressed as a group of analytic geometric "figures", such as circles and straight lines. A diagram drawing is also referred to as a "vector representation" (a vector drawing). Meanwhile, an image drawing is a bitmap drawing and is also referred to as a "raster representation" (a raster drawing).

FIG. 1B illustrates an example of that output in a case where the gradation drawing in FIG. 1A is expressed as a diagram drawing. In FIG. 1B, input data is divided into units of the same color, and each unit is expressed as a diagram drawing. FIG. 1C illustrates an example of that output where the input data for FIG. 1A is expressed as an image drawing. The source data is simply bitmapped in FIG. 1C.

For a simple figure or an illustration, a diagram drawing is advantageous in that the data volume is smaller and the processing speed is high in comparison to an image drawing. On the other hand, for a complex image, a diagram drawing is disadvantageous in that the number of drawing objects is incredibly high and the printing time of a printing apparatus is long. Therefore, there are cases where it is desirable to express a complex image as an image drawing.

Japanese Patent Laid-Open No. 2010-56931 discloses a method for determining whether to express a gradation drawing as an image drawing or a diagram drawing. In this method, a diagram drawing is selected when the bands of color change are large, i.e., the bands of same colors have large widths.

Japanese Patent Laid-Open No. 2010-56931 does not take into account the fact that, for a gradation drawing, there are cases in which the complexity of drawing processing varies depending on the gradation characteristics, such as the orientation of the gradation.

For example, when a linear gradation drawing in which colors change in the main-scanning direction is drawn one line at a time in the main-scanning direction, the color change in each line is intense.

In contrast, when a linear gradation drawing in which colors change in the sub-scanning direction is drawn one line at a time in the main-scanning direction, the color change in each line is mild or nonexistent. In this way, the color change (complexity) in each line differs depending on the orientation of the gradation. It is desirable to use the more appropriate rendering method between image drawing and diagram drawing depending on whether the color change is intense or mild in a line.

However, Japanese Patent Laid-Open No. 2010-56931 does not take into account assigning a rendering method appropriate for an output in accordance with the orientation of the gradation and the processing content of the printing apparatus.

SUMMARY OF THE INVENTION

An aspect of the present invention is to eliminate the above-mentioned problem with conventional technology. A feature of the present invention is to provide a technique of assigning a rendering method appropriate for an output in accordance with the characteristics of gradation.

One aspect of the present invention provides an image processing apparatus provided with a printer driver, the apparatus comprising: an input interface that accepts a print request; at least one memory device that stores a set of instructions; and at least one processor that executes the set of instructions to: detect an orientation of a color change in a gradation included in the print request; determine a rendering method of the gradation based on the detected orientation of the color change; and instruct a printing apparatus to perform printing in accordance with the determined rendering method.

Further features of the present invention will become apparent from the following description of exemplary embodiments (with reference to the attached drawings).

BRIEF DESCRIPTION OF THE DRAWINGS

FIGS. 2A and 2B are diagrams illustrating command examples for a gradation drawing input to a driver.

FIG. 3 is a block diagram illustrating an example of an image processing system that executes an image processing method according to an embodiment.

FIGS. 9A and 9B are diagrams illustrating examples of gradation drawings.

DESCRIPTION OF THE EMBODIMENTS

Figure 1A:
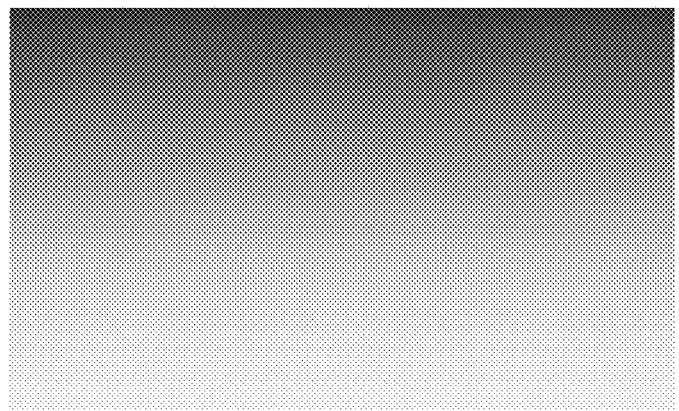
FIGS. 1A to 1C are diagrams illustrating examples of a gradation drawing, a diagram drawing, and an image drawing.

Hereinafter, embodiments will be described in detail with reference to the attached drawings. Note, the following embodiments are not intended to limit the scope of the claimed invention. Multiple features are described in the embodiments, but limitation is not made of an invention that requires all such features, and multiple such features may be combined as appropriate. Furthermore, in the attached drawings, the same reference numerals are given to the same or similar configurations, and redundant description thereof is omitted.

First Embodiment

Figures 2B, 3:
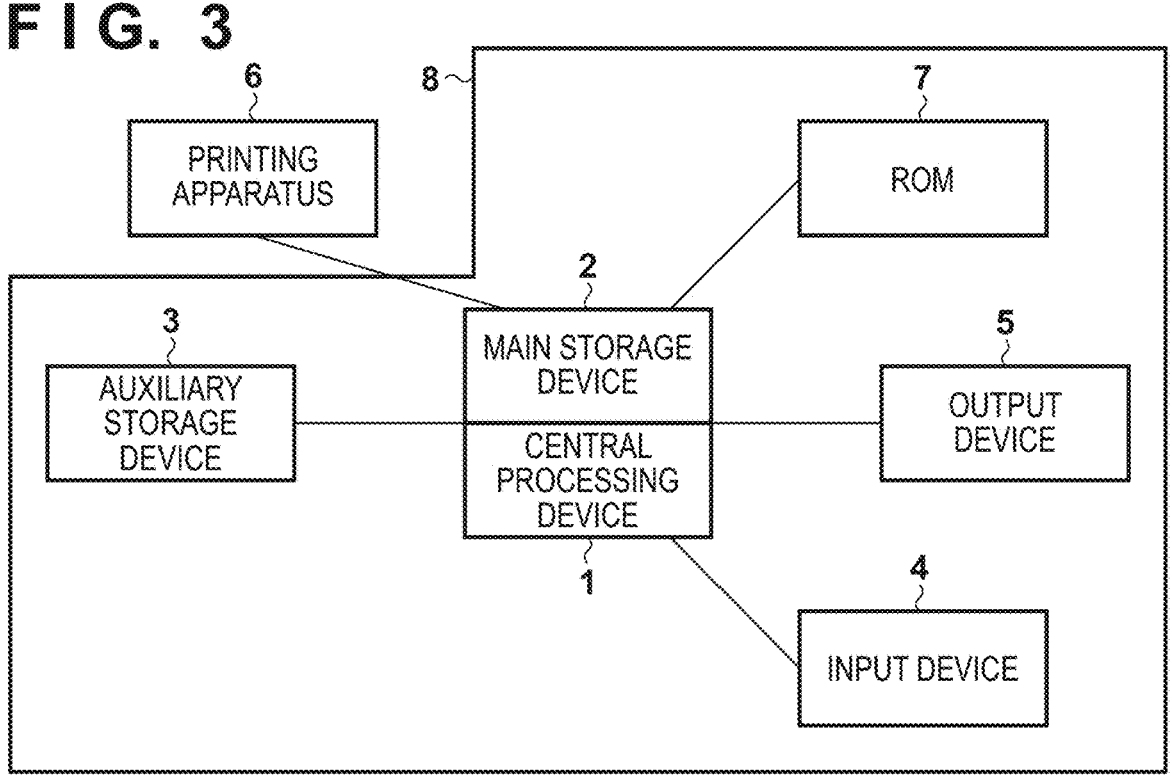

FIG. 3 is a diagram illustrating an example of an image processing system that executes an image processing method according to this embodiment. The image processing system according to an example determines a PDL appropriate for a gradation drawing when a print request including a gradation drawing command is input to a printer driver. The image processing system includes a client computer 8 and a printing apparatus 6 that are communicably connected to each other.

The client computer 8 includes a central processing device 1, a main storage device 2, an auxiliary storage device 3, an input device 4, an output device 5, and a ROM 7. The central processing device 1 and the other devices are communicably connected to each other.

The central processing device 1 comprehensively controls the operations of the image processing system by loading system programs and application programs from the auxiliary storage device 3 to the main storage device 2 and executing these programs. The central processing device 1 processes the information input from the input device 4, and outputs the processing result to the output device 5 and the printing apparatus 6.

The main storage device 2 is a system work memory for operating the central processing device 1, and is also an image memory for temporarily storing image data to be processed by the image processing system. The auxiliary storage device 3 is a storage medium, such as an HDD, an SSD, an FD, a CD-ROM, an IC memory card, or the like, and stores the above-mentioned system programs and application programs. The auxiliary storage device 3 may include a hard disc or a magneto-optical disc, or include a combination of these discs.

The input device 4 is an input interface (I/F) including a keyboard, a pointing device, and the like. The output device 5 is an output I/F including a display apparatus, such as a display.

The printing apparatus 6 is an apparatus, such as a printer, that outputs image data onto an output medium, which includes at least one of paper, metal, and plastic, according to an instruction made by the central processing device 1. The printing apparatus 6 performs print processing according to the print data transmitted from a host apparatus connected thereto, which, in this case, is the client computer 8.

The ROM 7 stores programs that are executed by the image processing system at start-up.

Note that, in this embodiment, the output device 5 is a display apparatus, such as a display, and is distinguished from the printing apparatus 6, which outputs image data onto an output medium.

Furthermore, in this embodiment, the image processing system is described as being provided in a single apparatus. However, the image processing system may be provided as multiple apparatuses connected to each other via a network.

Figure 4:
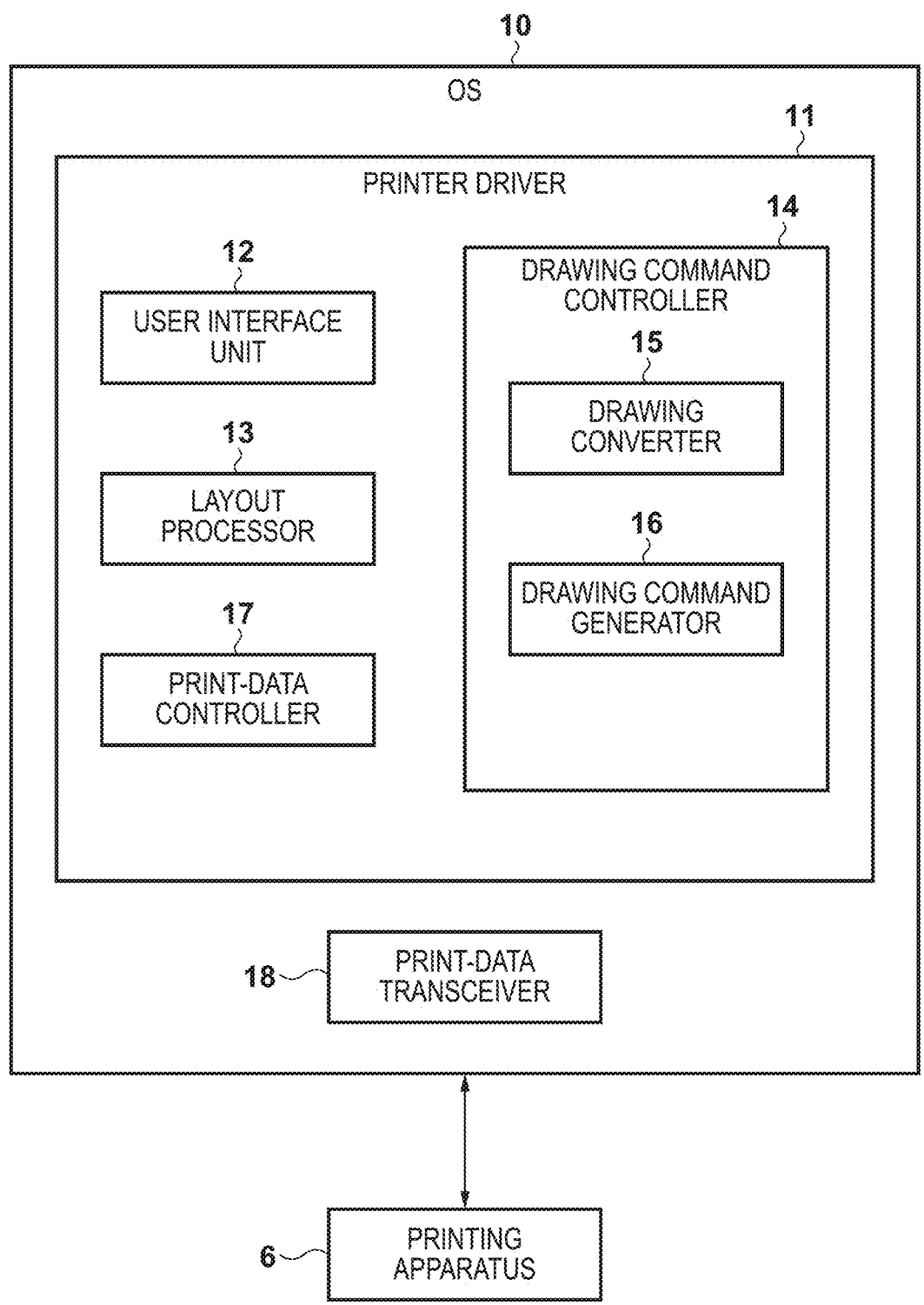
FIG. 4 is a system configuration diagram illustrating an overall configuration of an image processing system according to an embodiment.

FIG. 4 is a functional block diagram illustrating the central processing device (processor) 1 in the image processing system according to this embodiment. The central processing device (processor) 1 of the client computer 8 functions as processors 12 to 18 by executing programs. The central processing device 1 executes the program for an OS 10 so as to comprehensively control the client computer 8 in the image processing system as described below. Furthermore, the client computer 8 is connected to the printing apparatus 6 described below via a network.

A printer driver 11 is a program executed on the OS 10 to control the printing apparatus 6 and includes modules for causing the central processing device 1 to function as the processors 12 to 17.

Examples of printer drivers for Windows are a graphics device interface (GDI) printer driver and an XML paper specification (XPS) printer driver (hereinafter, referred to as a "V4 printer driver"). The GDI printer driver interprets a GDI format and generates a printer description language (PDL). The V4 printer driver interprets an XPS format and generates a PDL.

When performing print processing, a conventional application outputs an input command in a GDI format to the GDI printer driver. An application that can output such a GDI input command is referred to as a "GDI application" in this embodiment. In contrast, when performing print processing, a new application supporting the V4 printer driver directly outputs an XPS input command to the V4 printer driver. In this embodiment, an application that is able to output such an XPS input command is referred to as an "XPS application".

A user interface unit 12 is used by a user of the present invention so as to input various print settings, such as settings for the printing apparatus 6, and instruct printing.

A layout processor 13 receives an input command designated, at the time of printing, by an application that performs document creation and the like, and performs conversion related to the layout, such as N-up.

A drawing command controller 14 receives an input command designated by the layout processor 13 and creates drawing data processible by the printing apparatus 6. Moreover, the drawing command controller 14 includes important processors, including a drawing converter 15 and a drawing command generator 16, of the host apparatus in the printing system according to this embodiment. The drawing converter 15 converts an input gradation drawing to an appropriate PDL command.

The drawing command generator 16 creates an output command based on the PDL command accepted from the drawing converter 15.

A print-data controller 17 is a controller that converts the output command created by the drawing command generator 16 to print data corresponding to the printing apparatus 6, and further generates the entirety of the print data. Specifically, the print-data controller 17 controls the settings of print jobs, such as the PJL.

A print-data transceiver 18 is a function of the OS, and transmits and receives data to and from the printing apparatus 6. The print-data transceiver 18 transmits the print data generated by the print-data controller 17 to the printing apparatus 6.

The operations of the printer driver according to this embodiment having the above-described configuration will be described with reference to FIG. 5. Note that the program of the printer driver 11 related to this flow is stored in the auxiliary storage device 3, read by the main storage device 2, and executed by the central processing device 1.

Figure 5:
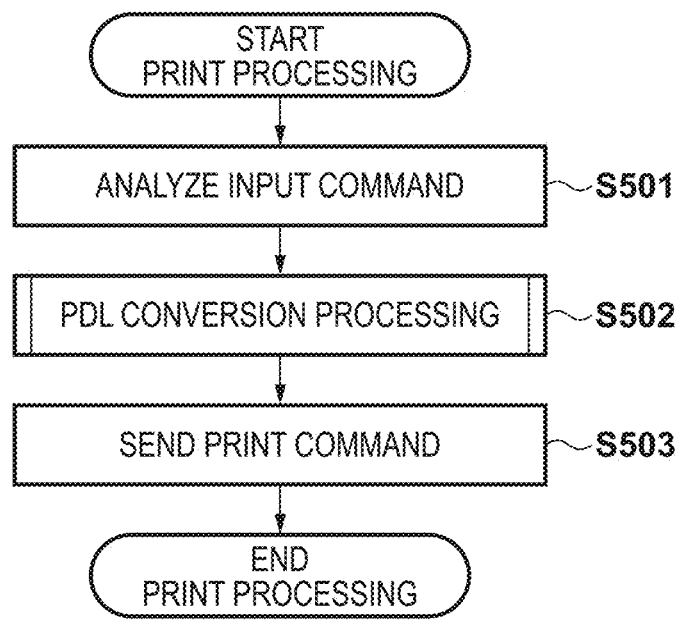
FIG. 5 is a flowchart illustrating a print processing system according to an embodiment.

FIG. 5 is a flowchart illustrating an example of a process performed by the printer driver 11 according to this embodiment. In response to a user starting an application and instructing printing, the input command sent from the application is transmitted to the printer driver 11. Then, the printer driver 11 starts the flowchart in FIG. 5.

First, in step S501, the printer driver 11 analyzes the received input command (printer request).

Subsequently, the central processing device 1 causes the process to proceed to step S502, and the printer driver 11 performs optimization processing described below with reference to FIG. 6. Here, an input command that is to be converted to clipping rendering is determined, and the input command is converted to clipping rendering.

In step S503, the printer driver 11 converts intermediate data (described below) acquired as a processing result in step S502 to an output command that can be received by the printing apparatus 6. Now, if, for example, an input command including an Alpha channel exists in the intermediate data, the printer driver 11 converts the intermediate data to an output command processible by the printing apparatus 6 by performing processing, such as deleting the Alpha channel or replacing the drawing with another drawing.

Note that the term "output command" specifically refers to a "PDL output command", where the PDL is PS (developed by Adobe Inc.), PCL (developed by Hewlett-Packard Co.), or the like. In this specification, the output PDL is PCL, unless otherwise specified. Furthermore, the intermediate data is in the format of the drawing content held in the printer driver 11 while the input command is converted to an output command. The format may be a unique format or may be the same format as that of the input command.

In step S503, the printer driver 11 transmits a print command (print instruction) based on the output command to the printing apparatus 6 via the print-data transceiver 18. The printing apparatus 6 performs rendering and halftoning on the received print command, and then outputs the resulting print command onto an output medium, and the print processing ends.

Figure 6:
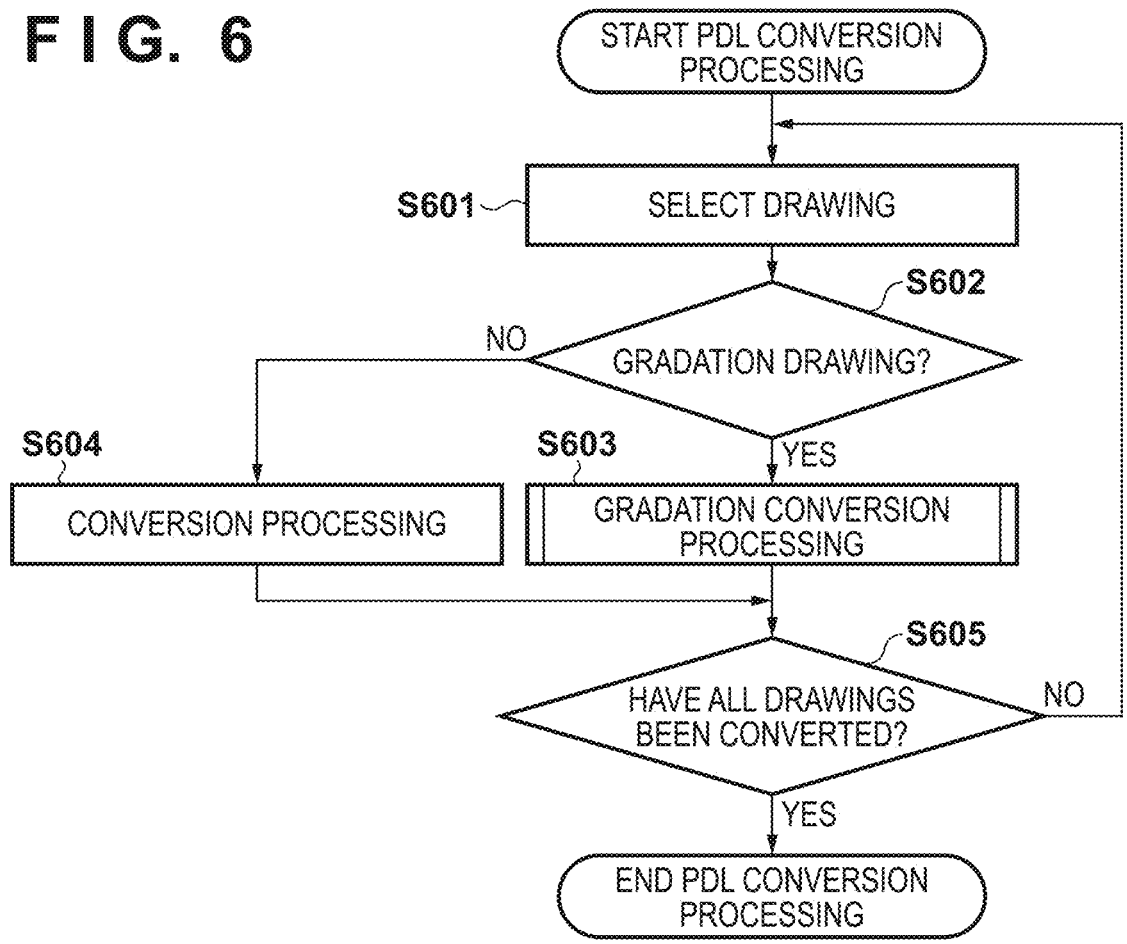
FIG. 6 is a flowchart illustrating an example of PDL conversion processing according to an embodiment.

FIG. 6 is a flowchart illustrating the details of the PDL conversion processing in step S502 and the PDL conversion processing is performed by the drawing converter 15 illustrated in FIG. 4.

In step S601, the drawing converter 15 selects one of the drawing commands included in the received input command. Subsequently, in step S602, the drawing converter 15 determines whether or not the received drawing command is for a "gradation drawing". If it is determined that the drawing command is for a gradation drawing (YES in step S602), the process proceeds to step S603, and if it is not determined to be for a gradation drawing (NO in step S602), the process proceeds to step S604.

In step S603, the drawing converter 15 performs gradation conversion processing described below with reference to FIG. 7, and causes the process to proceed to step S605. In step S604, the drawing converter 15 performs conversion processing to convert the gradation drawing to a corresponding PDL, and causes the process to proceed to step S605. In step S605, it is determined whether or not all drawing commands included in the input command have been subjected to the processing in steps S602, S603, or S604. If it is determined that all drawing commands included in the input command have been subjected to the processing in step S602 (YES in step S605), the processing in FIG. 6 ends. Otherwise, the process returns to step S601, and the next drawing command is selected.

Figure 7:
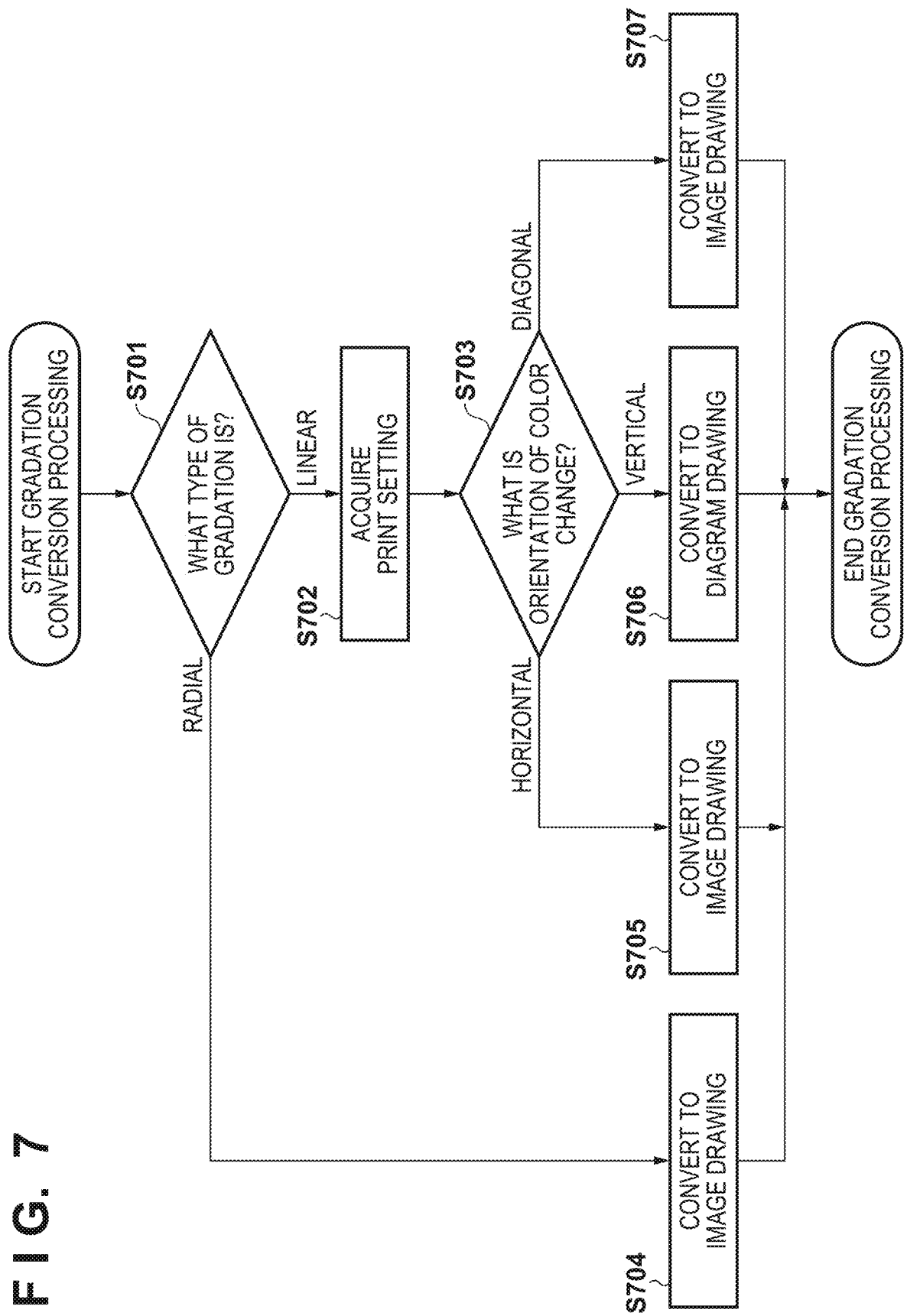
FIG. 7 is a flowchart illustrating an example of gradation conversion processing according to an embodiment.

FIG. 7 is a flowchart for gradation conversion processing, and illustrates a detailed example of step S603 in FIG. 6. The gradation conversion processing is performed by the drawing converter 15 illustrated in FIG. 4.

In step S701, the drawing converter 15 determines whether the type of gradation is radial gradation or linear gradation.

The types of gradation will now be described with reference to FIGS. 8A to 8D and FIGS. 9A and 9B.

Figure 8A:
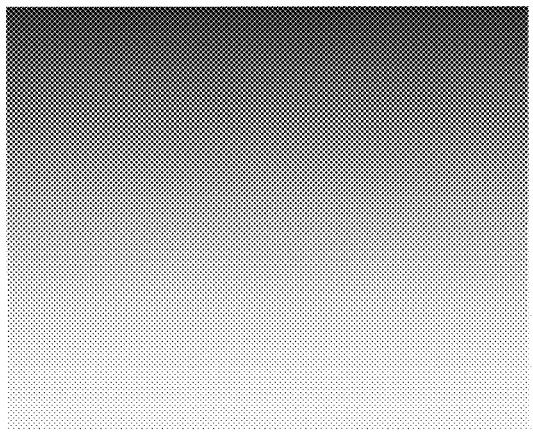
FIGS. 8A to 8D are diagrams illustrating examples of different types of gradation.
Figure 8B:
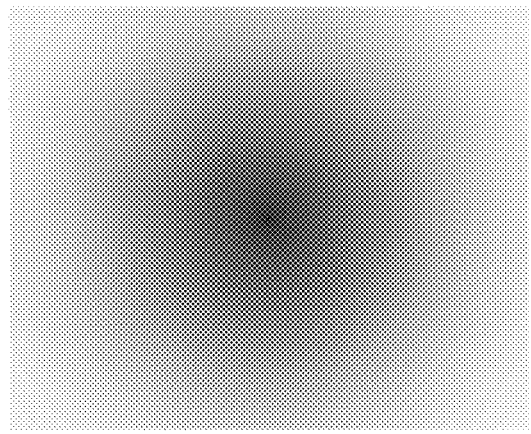
Figure 8C:
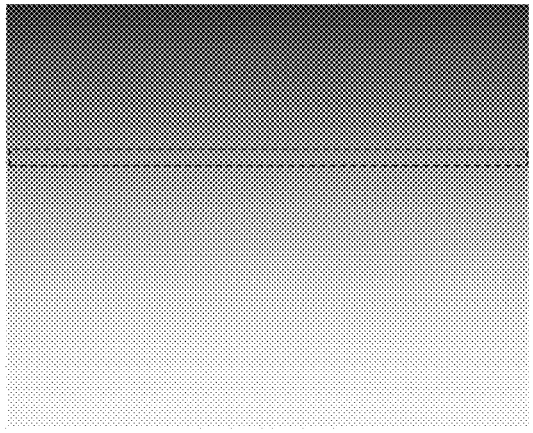
Figure 8D:
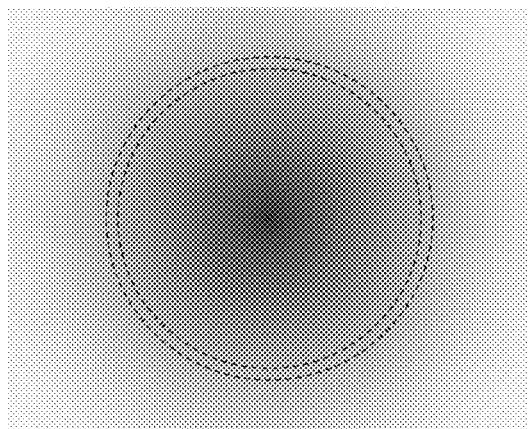

FIGS. 8A to 8D illustrate specific examples related to the types of gradation. FIG. 8A illustrates a linear gradation. FIG. 8B illustrates a radial gradation. FIGS. 8C and 8D illustrate the same gradations as those illustrated in FIGS. 8A and 8B, respectively, with dashed lines indicating regions of the same color. In a linear gradation, same colors are arranged along a straight line, as indicated by the dashed lines in FIG. 8C. In a radial gradation, same colors are arranged along a circumferential line, as indicated by the dashed lines in FIG. 8D.

FIGS. 9A and 9B illustrate specific examples of input commands for different types of gradation in XPS. FIG. 9A illustrates an XPS input command representing a linear gradation, and FIG. 9B illustrates an XPS input command representing a radial gradation. The input command in FIG. 9A represents a gradation as illustrated in FIG. 8A and the input command in FIG. 9B represents a gradation as illustrated in FIG. 8B.

Now, refer back to FIG. 7. In step S701, if the drawing converter 15 determines that the type of gradation is a radial gradation (RADIAL in step S701), the process proceeds to step S703, and if the type is determined to be a linear gradation (LINEAR in step S701), the process proceeds to step S702.

Note that, in this embodiment, it is determined whether the type of gradation is a radial or linear gradation. However, other types of gradation may be used. For example, the type of gradation may be a quadrangular gradation. In such a case, in step S701, whether the type of gradation is a linear gradation or another type of gradation may be determined.

In step S702, the drawing converter 15 acquires the print settings and specifies the information related to the scanning direction of the printing apparatus 6 and the imposition, such as 2 in 1 imposition. In step S703, the drawing converter 15 detects the orientation of a linear color change.

Figure 10A:
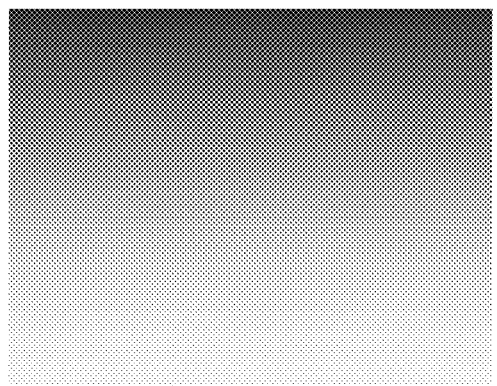
FIGS. 10A to 10F are diagrams illustrating examples of linear gradation.
Figure 10D:
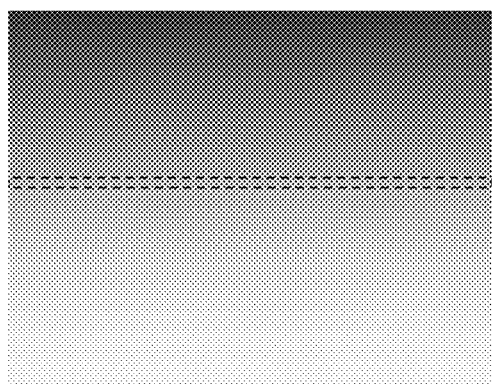
Figure 10B:
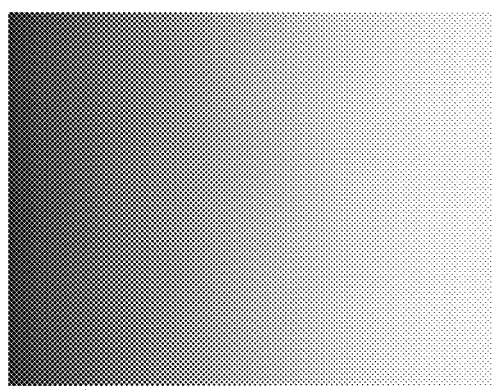
Figure 10E:
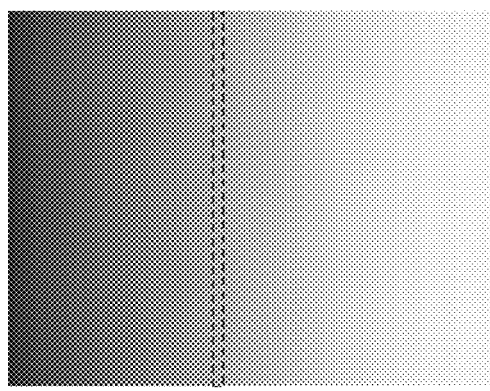
Figure 10C:
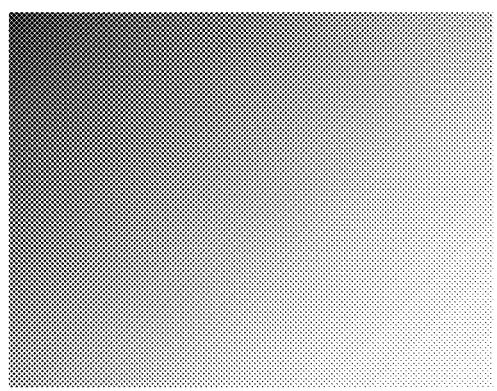
Figure 10F:
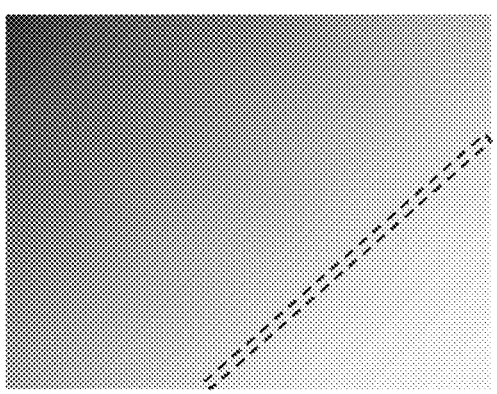

The orientation of the color change will now be described with reference to FIGS. 10A to 10F. FIGS. 10A to 10F illustrate specific examples related to the orientation of a color change. FIGS. 10A to 10C illustrate linear gradations and in the FIGS. 10D to 10F, the regions indicated by dashed lines respectively have the same colors. In FIG. 10A, same colors are arranged in the horizontal direction, and the colors change in the direction orthogonal to the main-scanning direction, and thus this gradation is referred to as a "linear gradation in the vertical direction". In FIG. 10B, same colors are arranged in the vertical direction, and the colors change in a direction parallel to the main-scanning direction, and thus this gradation is referred to as a "linear gradation in the horizontal direction". The gradation illustrated in FIG. 10C is neither a linear gradation in the vertical direction nor a linear gradation in the horizontal direction, and thus this gradation is referred to as a "linear gradation in a diagonal direction".

Now, refer back to FIG. 7. If the color change is detected as having a horizontal orientation (HORIZONTAL in step S703), the process proceeds to step S705. If the color change is detected as having a vertical orientation (VERTICAL in step S703), the process proceeds to step S706. If the color change is detected as having a diagonal orientation (DIAGONAL in step S703), the process proceeds to step S707.

Note that, the horizontal or vertical orientation is determined based on the information acquired in step S702 at the time the information is output onto an output medium by the printing apparatus 6. Hereinafter, the terms "horizontal" and "vertical" correspond to the orientations of the information at the time the information is output onto an output medium by the printing apparatus 6. That is, the orientation of the color change determined in step S703 may be the orientation of the color change in a gradation drawing in the direction in which the information is to be output onto the output medium relative to the sub-scanning direction of the printing apparatus 6. Therefore, in an example, the orientation of the color change is specified based on the page rotation setting of the print settings acquired in step S702 and the sub-scanning direction of the printing apparatus, in addition to the rendering method of the gradation of the figure.

Figure 1B:
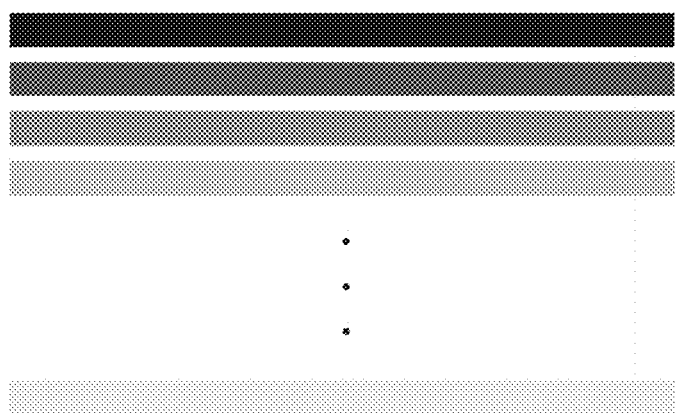
Figure 1C:
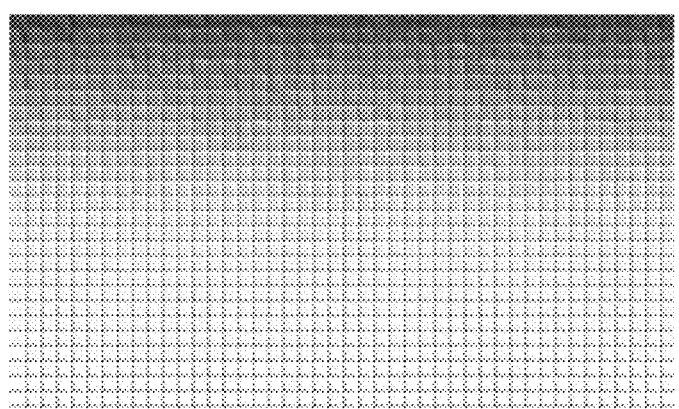

In steps S704, S705, and S707, the drawing converter 15 converts the gradation drawing to an image drawing, such as that illustrated in FIG. 1C as described above.

In step S706, the drawing converter 15 converts the gradation drawing to a diagram drawing, such as that illustrated in FIG. 1B as described above.

In this way, the output speed can be improved by assigning image drawing or diagram drawing as a gradation rendering method depending on the characteristics of the gradation included in the print request input to the printer driver.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-077355, filed Apr. 15, 2019, which is hereby incorporated by reference herein in its entirety.

What is claimed is:

1. An information processing apparatus that transmits data to a printer, the apparatus comprising:
    at least one memory device that stores a set of instructions; and
    at least one processor that executes the set of instructions to:
        receive a print setting and a gradation object;
        detect an orientation of a color change in the gradation object;
        based on the print setting and the detected orientation, determine whether the orientation of the color change in the gradation object when rendered in the printer matches a main scanning direction of the printer;
        based on a determination that the orientation matches the main scanning direction, render the gradation object in the information processing apparatus and then transmit the rendered gradation object to the printer; and
        based on a determination that the orientation does not match the main scanning direction, transmit the gradation object to the printer without rendering the gradation object in the information processing apparatus.

2. The image processing apparatus according to claim 1, wherein rendering the gradation object is image drawing in which drawing is performed using raster representation or diagram drawing in which drawing is performed using vector representation.

3. The image processing apparatus according to claim 1, wherein the at least one processor determines the rendering method of the gradation based on the detected orientation of the color change in the gradation and the acquired print setting.

4. The image processing apparatus according to claim 3, wherein the print setting includes information for specifying a scanning direction of the printing apparatus and an orientation in which the gradation is to be output onto an output medium.

5. The image processing apparatus according to claim 4, wherein, when the gradation is a radial gradation, the at least one processor determines the rendering method of the gradation to be the image drawing.

6. The image processing apparatus according to claim 4, wherein, when the gradation is a linear gradation and the detected orientation of the color change is the same as a main-scanning direction of the printing apparatus, the at least one processor determines the rendering method of the gradation to be diagram drawing.

7. The image processing apparatus according to claim 1, wherein the at least one processor instructs the printing apparatus to perform printing in a printer description language.

8. The image processing apparatus according to claim 1, wherein the print request is in an XML Paper Specification format or a Graphic Device Interface format.

9. An image processing method executed by an image processing apparatus provided with a printer driver, the method including:
    receiving a print setting and a gradation object;
    detecting an orientation of a color change in the gradation object;
    based on the print setting and the detected orientation, determining whether the orientation of the color change in the gradation object when rendered in the printer matches a main scanning direction of the printer;

based on a determination that the orientation matches the main scanning direction, rendering the gradation object in the information processing apparatus and then transmitting the rendered gradation object to the printer; and based on a determination that the orientation does not match the main scanning direction, transmitting the gradation object to the printer without rendering the gradation object in the information processing apparatus.

10. A non-transitory computer-readable storage medium storing instructions for causing an image processing apparatus provided with a printer driver to execute an image processing method including:

receiving a print setting and a gradation object;

detecting an orientation of a color change in the gradation object;

based on the print setting and the detected orientation, determining whether the orientation of the color change in the gradation object when rendered in the printer matches a main scanning direction of the printer;

based on a determination that the orientation matches the main scanning direction, rendering the gradation object in the information processing apparatus and then transmitting the rendered gradation object to the printer; and based on a determination that the orientation does not match the main scanning direction, transmitting the gradation object to the printer without rendering the gradation object in the information processing apparatus.

* * * * *